US006716337B2

United States Patent
Nieman et al.

(10) Patent No.: US 6,716,337 B2
(45) Date of Patent: Apr. 6, 2004

(54) CATALYST CARRIER WITH HIGH DIESEL SELECTIVITY

(75) Inventors: Jan Nieman, Maarssen (NL); Johannes Wilhelmus Maria Sonnemans, Soest (NL); Bas De Kroes, Bussum (NL)

(73) Assignee: Akzo Nobel NV (NL)

( * ) Notice: Subject to any disclaimer, the term of this patent is extended or adjusted under 35 U.S.C. 154(b) by 181 days.

(21) Appl. No.: 09/773,361

(22) Filed: Jan. 31, 2001

(65) Prior Publication Data

US 2002/0179490 A1 Dec. 5, 2002

Related U.S. Application Data

(63) Continuation of application No. PCT/EP99/05049, filed on Jul. 15, 1999, now abandoned.

(30) Foreign Application Priority Data

Aug. 5, 1998 (EP) ............................................ 98202635

(51) Int. Cl.$^7$ ................................................. B01J 29/06
(52) U.S. Cl. ............................... 208/111.3; 208/111.35; 208/111.01; 502/66; 502/68; 502/74; 502/79; 502/80; 502/84
(58) Field of Search ............................. 502/64, 66, 68, 502/74, 79, 80, 84; 208/111.01, 111.3, 111.35

(56) References Cited

U.S. PATENT DOCUMENTS 3,951,864 A * 4/1976 Meyer ........................ 502/66
4,849,394 A * 7/1989 Chapple ..................... 502/234

FOREIGN PATENT DOCUMENTS

| EP | 0 536 815 | 4/1993 | ........... C10G/11/05 |
| EP | 0 540 123 | 5/1993 | ........... B01J/29/08 |
| WO | WO 96/07477 | 3/1996 | ........... B01J/21/16 |
| WO | WO 00/00286 | 1/2000 | ........... B01J/37/03 |

* cited by examiner

*Primary Examiner*—Kiley Stoner
*Assistant Examiner*—Christina Ildebrando
(74) *Attorney, Agent, or Firm*—Louis A. Morris

(57) ABSTRACT

The invention pertains to a carrier composition comprising (a) at least 30 wt % of a synthetic cracking component, based on the total weight of the carrier composition, which comprises oxidic compounds of one or more trivalent metallic elements, tetravalent metallic elements, and divalent metallic elements, said cracking component comprising elemental clay platelets with an average diameter of 1 $\mu$m or less and an average degree of stacking of 20 platelets per stack or less, and/or comprising a cogel with a saponite content $C_A$ of less than 60%, in which the total of sodium and potassium amounts to less than 1 wt %, based on the total weight of the cogel, and (b) 1–25 wt % of a zeolite Y, based on the total weight of the carrier composition, with a unit cell size below 24.35 Å. The invention further pertains to a catalyst comprising said carrier composition and at least a hydrogenation metal, and a process for converting heavy feedstock into middle distillates using said catalyst.

9 Claims, No Drawings

CATALYST CARRIER WITH HIGH DIESEL SELECTIVITY

CROSS REFERENCE TO RELATED APPLICATIONS

This application is filed as a continuation of PCT International Filing Number PCT/EP99/05049, having International Filing date Jul. 15, 1999, now abandoned which claims priority from European Application Serial No.: EP98202635.3, filed Aug. 5, 1998.

BACKGROUND OF THE INVENTION

1. Field of the Invention

The invention relates to a carrier suitable for use in a hydrocracking catalyst that has a high selectivity for middle distillates, in particular diesel, and to a hydrocracking process in which such a catalyst is used.

2. Prior Art

The oil refining industry commonly employs hydrocracking processes to convert hydrocarbonaceous feedstocks into products of a lower boiling range. Such processes entail contacting the feedstock with hydrogen at elevated temperature and pressure under the influence of a catalyst, with the catalyst containing at least a hydrogenation component and an acidic component, the latter effecting the actual cracking. Conventional acidic components include zeolitic acidic components, in particular Y-zeolites, and amorphous acidic components, in particular silica-aluminas.

Nowadays, the conversion of heavy hydrocarbon feedstocks into middle distillates, in particular diesel, is becoming more and more important, and there is a continuing focus on developing catalyst compositions with a high selectivity for diesel.

A catalyst suitable for the production of diesel has been described, e.g., in EP0540123. This reference discloses carrier compositions which contain less than 25 wt % of a zeolite Y with a unit cell size below 2.437 nm, more than 25 wt % of a binder selected from alumina, silica, magnesia, titania, clays, zirconia, silica-zirconia, and silica-boria, and at least 30 wt % of a dispersion of silica-alumina in an alumina matrix. In the one Example of this publication a catalyst is described which comprises nickel and tungsten on a carrier comprising 4 wt % of Y-zeolite, 30 wt % of an alumina binder, and 66 wt % of a silica-alumina. Although this catalyst shows good results in diesel production, there is still need for a catalyst showing a higher selectivity in this application.

A further trend in the field of hydrocracking is the development of alternative acidic components. This development is reflected, e.g., in WO 96/07477. This reference describes carrier compositions which comprise elemental clay platelets with an average diameter of 1 µm or less and an average degree of stacking of 20 platelets per stack or less. If so desired, the carrier can also contain a matrix material selected from, int. al., amorphous materials such as silica, alumina, silica-alumina, titania and/or zirconia, and optionally, in addition, a zeolite. The carrier composition is used in catalysts suitable for hydroprocessing applications. These catalysts contain the carrier composition as defined above and at least a hydrogenation metal. The term "hydroprocessing" in this reference encompasses all processes in which a hydrocarbon feed is reacted with hydrogen at elevated temperature and elevated pressure. These processes include hydrodesulfurisation, hydrodenitrogenation, hydrodemetallisation, hydrodearomatisation, hydroisomerisation, hydrodewaxing, hydrocracking, and hydrocracking under mild pressure conditions, which is commonly referred to as mild hydrocracking.

The trend towards alternative cracking components is further reflected in the non-prepublished international patent application No. PCT/EP99/05818 filed with the European Patent Office on Jun. 24, 1999 with the title "Cogel Containing Oxidic Compounds of Tetravalent, Trivalent, and Divalent Metallic Elements" (inventors: J. Nieman, and S. Janbroers), claiming priority of EP 98202600.7 and EP 98202185.9. This reference discloses carrier compositions comprising a cogel of oxidic compounds of one or more di-, tri-, and tetravalent metallic elements, which apart from optionally present saponite is essentially X-ray amorphous and which has a B.E.T. surface area of at least 400 m$^2$/g, a cation-exchange capacity of at least 0.5 wt %, and a saponite content $C_A$ of less than 60%, with the total of sodium and potassium amounting to less than 0.5 wt %, based on the total weight of the cogel. If so desired, the carrier can also contain a support material selected from, int. al., amorphous materials such as silica, alumina, silica-alumina, titania and/or zirconia, and optionally, in addition, a zeolite. This carrier composition is described as suitable for use in hydroprocessing catalysts in general. The amount of zeolite in the catalysts of both WO 96/07477 and the above-mentioned non-prepublished international patent application, if present at all, is specified to be 3–55 wt %, based on the total weight of the catalyst. This corresponds to 3–92 wt %, based on the total weight of the carrier composition, if 3–40 wt % of hydrogenation metal is present in the catalyst. No catalysts containing both a zeolite and a clay or cogel component, respectively, are disclosed in the Examples of these references. Neither is there any indication of any specific suitability of these cracking components for the production of diesel.

SUMMARY OF THE INVENTION

The carrier composition of the present invention comprises a) at least 30 wt % of a synthetic cracking component, based on the total weight of the carrier composition, which comprises oxidic compounds of one or more trivalent metallic elements, tetravalent metallic elements, and divalent metallic elements, said cracking component comprising elemental clay platelets with an average diameter of 1 µm or less and an average degree of stacking of 20 platelets per stack or less, and/or comprising a cogel with a saponite content $C_A$ of less than 60%, and in which the total of sodium and potassium (calculated as metal) amounts to less than 1 wt %, based on the total weight of the cogel, and b) 1–25 wt % of a zeolite Y, based on the total weight of the carrier composition, with a unit cell size below 24.35 å.

Other embodiments of the present invention encompass further details relating to further ingredients in the catalyst composition, and details concerning the process for preparation of the composition and processes in which the catalyst is used, all of which are hereinafter disclosed in the following discussion of each of those facets of the invention.

DETAILED DISCRIPTION OF THE INVENTION

We have surprisingly found that the diesel selectivity of a hydrocracking catalyst can be significantly increased when the carrier composition of the present invention is used in the catalyst instead of carrier compositions conventionally used in this field which are based on, e.g., the combination of zeolite with silica-alumina as amorphous cracking component as disclosed in EP0540123.

The invention will be further described below.

Preferably, the carrier composition of the present invention comprises 2–20 wt % and more preferably 2–12 wt % of the zeolite, based on the total weight of the carrier composition. Further, it is preferred that the carrier composition comprises at least 40 wt % and more preferably at least 50 wt % of the synthetic cracking component, based on the total weight of the carrier composition. Optionally, the carrier composition additionally comprises an amorphous support material.

Clay Platelets

The clay platelets that may be used in the carrier composition of the present invention as the synthetic cracking component comprise elemental clay platelets with an average diameter of 1 μm or less and an average degree of stacking of 20 platelets per stack or less.

Preferably, the average diameter of the clay platelets used in the carrier composition of the present invention is between 1 nm and 0.5 μm, more preferably in the range of 1 nm to 0.1 μm, and most preferably in the range of 1 to 50 nm. The average degree of stacking of the clay platelets is preferably not more than 10 platelets per stack, more preferably not more than 5 platelets per stack, and most preferably not more than 3 platelets per stack. The lower limit is constituted by unstacked clay platelets, which have a "degree of stacking" of 1. The two parameters are easily determined by means of transmission electron microscopy.

The counter-ions in the interlayer between the clay platelets can be replaced by $H_3O^+$ ions. $H_3O^+$ ions can be introduced into the clay platelets via ion-exchange with, e.g., hydrolysable metal ions or ammonium ions. As will be evident to the skilled person, this can be effected in a manner analogous to that known in the art for the conversion of NaY zeolites into HY zeolites.

If so desired, the clays used in the carrier composition of the present invention may be pillared.

The clays used in the carrier composition according to the present invention generally have a B.E.T. surface area in the range of 100 to 1000 m²/g, depending on the nature of the metallic elements present in the octahedron layer. The pore volume, determined by means of nitrogen adsorption, is in the range of 0.03 to 1.5 ml/g, again depending on the nature of the metallic elements present in the octahedron layer.

The one or more trivalent metallic elements are generally selected from the group of aluminum, borium, gallium, chromium, iron, cobalt, manganese, vanadium, molybdenum, tungsten, indium, rhodium, scandium, or mixtures thereof. They preferably comprise aluminum and more preferably consist essentially of aluminum. The one or more tetravalent metallic elements are generally selected from the group of silicon, titanium, germanium or mixtures thereof. They preferably comprise silicon and more preferably consist essentially of silicon. The one or more divalent metallic elements are generally selected from magnesium, zinc, manganese, copper, beryllium, iron, cobalt, nickel, or mixtures thereof. They preferably comprise and more preferably consist essentially of magnesium.

The clay platelets used in the carrier composition of the present invention are preferably saponites.

Preferably, the clay platelets used in the carrier composition of the present invention are those described in WO 96/07477.

Cogel

The cogel that may be used as the synthetic cracking component in the carrier composition of the present invention has a saponite content $C_A$ of less than 60%, and the total of sodium and potassium present in the cogel amounts to less than 1 wt %, based on the total weight of the cogel.

To show sufficient catalytic activity, the cogel must contain less than 1 wt % of the total of sodium and potassium, based on the total weight of the dry cogel. Preferably, the total of sodium and potassium, based on the total weight of the dry cogel, amounts to less than 0.5 wt %, more preferably to less than 0.3 wt %, still more preferably to less than 0.2 wt %, and most preferably to less than 0.1 wt %, based on the total weight of the cogel.

As stated above, the saponite content $C_A$ of the cogel contained in the carrier composition of the present invention is less than 60%. Preferably, the saponite content $C_A$ is less than 55% and more preferably less than 50%. It is further preferred that the saponite content $C_A$ is at least 10% and more preferably at least 20%. In addition, it is further preferred that the saponite content $C_B$ is less than 30%, preferably less than 25% and more preferably less than 20%. The saponite contents $C_A$ and $C_B$ are determined by method A and B respectively, as defined in the above-mentioned non-prepublished international patent application.

Preferably, apart from optionally present saponite, the cogel contained in the carrier composition of the present invention is essentially X-ray amorphous. The term "X-ray amorphous" is well-known to the person skilled in the art and means that no crystalline peaks are contained in a spectrum but only broad amorphous peaks are observed. The term "essentially X-ray amorphous" in the sense of the present invention means that apart from any saponite peaks, there are essentially no further crystalline peaks visible in the X-ray diffraction pattern of the cogel. Of course, small crystalline peaks, e.g., due to impurities present in the cogel, such as brucite, are not excluded by the term "essentially X-ray amorphous". However, the term "essentially X-ray amorphous" in any case excludes cogels which apart from saponite, contain a major part of one or more further crystalline components. Saponite peaks generally include crystalline peaks located at 20°(2θ), 35°(2θ), and 60°(2θ), and optionally 28°(2θ).

Preferably, the cogel which is contained in the carrier composition of the present invention has a B.E.T. surface area of at least 400 m²/g. More preferably, the B.E.T. surface area of the cogel is at least 450 m²/g and most preferably it is at least 500 m²/g. The surface area is determined as described in the above-mentioned non-prepublished international patent application and if not mentioned otherwise is the surface area of an uncalcined sample.

As the carrier composition of the present invention is generally exposed to high temperatures during, e.g., calcination and/or use, it is further preferred that the surface area of the cogel does not decrease dramatically when exposed to high temperatures. More in particular, it is preferred that the quotient between the surface area of the cogel after calcination in air at 550° C. for one hour and the surface area of the uncalcined cogel is at least 0.80. It is further preferred that the surface area of the cogel after calcination in air at 550° C. for one hour is at least 350 m²/g and more preferably at least 400 m²/g.

It is preferred that the cogel contained in the carrier composition of the present invention has a cation-exchange capacity of at least 0.5 wt %, more preferably of at least 1.0 wt %, and most preferably of at least 2.0 wt %, based on the total weight of the cogel. Generally, the cation-exchange capacity of the cogel is less than 10 wt %, based on the total weight of the cogel. The cation exchange capacity is determined as defined in the above-mentioned non-prepublished international patent application.

Analogous to the surface area, the cation-exchange capacity of the cogel should not dramatically decrease when high temperatures are applied, e.g., during calcination or use. Therefore, it is preferred that the quotient between the cation-exchange capacity of the cogel after calcination in air at 550° C. for one hour and the cation-exchange capacity of the uncalcined cogel is at least 0.6 and more preferably at least 0.7. Furthermore, it is preferred that the cation-exchange capacity of a sample calcined in air for one hour at 550° C. is at least 0.5 wt %, more preferably at least 1.0 wt % and most preferably at least 2.0 wt %.

The di-, tri-, and tetravalent metallic elements are generally selected from those mentioned above for the clay platelets. The trivalent metallic element preferably comprises and more preferably consists essentially of aluminum. The tetravalent metallic element preferably comprises and more preferably consists essentially of silicon. The divalent metallic elements are preferably selected from non-Group VIII metallic elements such as, preferably, magnesium, zinc, manganese, copper, beryllium, or mixtures thereof, optionally in combination with one or more Group VIII non-noble metallic elements. Preferred Group VIII non-noble metallic elements are cobalt or nickel or mixtures thereof. The non-Group VIII metallic element preferably comprises magnesium and more preferably consists essentially of magnesium.

If the carrier composition of the present invention contains both clay platelets and a cogel, the di-, tri-, and tetravalent metallic elements may be the same or different in both the clay platelets and the cogel.

The molar ratio between the oxidic compounds of the tetravalent metallic elements and the oxidic compounds of the trivalent metallic elements of the cogel generally is at least 2 and not more than 30. Preferred are molar ratios of at least 4, even more preferably of at least 6. It is further preferred that the molar ratio is not more than 20, more preferably not more than 12. Generally, the atomic ratio between the one or more divalent metallic elements and the total of tri- and tetravalent metallic elements contained in the cogel lies between 0.03 and 1.00. It is preferred that this atomic ratio lies between 0.10 and 1.00 and more preferably between 0.20 and 0.50. The values given for the molar and atomic ratios are the ratios in the final cogel and can be determined from the final product by methods known in the art.

Preferably, the cogel used in the carrier composition of the present invention is that described in the above-mentioned non-prepublished international patent application.

Zeolite

The zeolite used in the carrier composition of the present invention is a Y-type zeolite having a unit cell size below 24.35 Å. Preferably, the zeolite has a unit cell size between 24.20 Å and 24.35 Å, and more preferably between 24.25 Å and 24.35 Å. The zeolite will generally contain less than 0.5 wt % of alkali metal oxide and preferably less than 0.2 wt %, based on the total weight of the zeolite. The molar ratio between the silicon and the aluminum contained in the zeolite preferably lies between 3.5 and 100 and more preferably between 12 and 100. Suitable zeolites are commercially available from, e.g., Zeolyst or Tosoh.

Support Material

In addition to the zeolite and the synthetic cracking component contained in the carrier composition of the present invention, the carrier composition may comprise an amorphous support material, e.g., alumina, silica, zirconia, titania, or mixtures of these materials. Preferably, the support material comprises and more preferably consists essentially of alumina.

Catalyst According to the Invention

The catalyst according to the invention comprises the carrier composition of the present invention and at least one hydrogenation metal component, with the hydrogenation metal being selected from the Periodic Table's Group VIB or Group VIII metals, or mixtures thereof. As will be evident to the skilled person, the word "component" in this context denotes the metallic form of the metal, its oxide form, or its sulfide form, or any intermediate, depending on the situation. Preferably, the hydrogenation metal is selected from one or more noble Group VIII metals or a combination of one or more Group VIB and one or more non-noble Group VIII metals. Even more preferably, a combination of molybdenum or tungsten with nickel or cobalt is employed as hydrogenation metal, most preferably a combination of tungsten with nickel. If the hydrogenation metal is selected from one or more noble Group VIII metals, the catalyst generally contains 0.05–5 wt % of the one or more noble Group VIII metals, calculated as metal, based on the total weight of the catalyst. If, on the other hand, the hydrogenation metal is selected from a combination of one or more Group VIB and one or more non-noble Group VIII metals, the catalyst generally contains 2–40 wt % of the one or more Group VIB metals, calculated as trioxide, and 1–10 wt % of the one or more non-noble Group VIII metals, calculated as oxide, based on the total weight of the catalyst.

Optionally, the catalyst can further contain other components such as phosphorus. It will be obvious to the skilled person that phosphorus can be incorporated into the catalyst in a suitable manner by contacting the catalyst during any one of its formative stages with an appropriate quantity of a phosphorus-containing compound, e.g., phosphoric acid. For instance, the catalyst can be impregnated with an impregnating solution comprising phosphorus in addition to any other components. If the catalyst according to the invention contains phosphorus, this compound is preferably present in an amount of 0.5–10 wt %, calculated as $P_2O_5$, based on the total weight of the catalyst.

The catalyst according to the invention generally has a B.E.T. surface area in the range of 50 to 600 $m^2/g$, preferably in the range of 100 to 400 $m^2/g$ (after calcination).

Preparation of the Catalyst According to the Invention

The catalyst of the present invention can be prepared by processes known in the art, e.g., according to the following procedure:

In a first step, zeolite, amorphous support material, and the synthetic cracking component are mixed. This can be done in several ways: it is, e.g., possible to first mix the amorphous support material and the zeolite, followed by mixing of the synthetic cracking component with the mixture of amorphous support material and zeolite. However, it is also possible to first mix the amorphous support material and the synthetic cracking component, followed by mixing of the zeolite with the mixture of amorphous support material and synthetic cracking component. Finally, it is also possible to add the amorphous support material, the synthetic cracking component, and the zeolite to a vessel and mix all three compounds simultaneously.

After the mixing step the mixture is shaped into particles, e.g., by extrusion. The metal components can, e.g., be incorporated into the catalyst composition by impregnating the shaped particles, optionally after intermediate calcination, with an impregnating solution containing precursors of the hydrogenation metal components to be introduced, optionally in combination with other components such as phosphoric acid and/or complexing agents known in the art. Alternatively, it is, e.g., also possible to add precursors of hydrogenation metal components during or subsequent to the above-described mixing step and prior to the shaping step. The metals-containing particles may be subjected to a final calcination for a period of, e.g., 0.1 to 10 hours at a temperature of generally 350°–900° C., preferably of 400°–800° C.

The catalyst particles may have many different shapes. The suitable shapes generally include spheres, cylinders, rings, and symmetric or asymmetric polylobes, for instance tri- and quadrulobes. The particles usually have a diameter in the range of 0.5 to 10 mm, and their length likewise is in the range of 0.5 to 10 mm.

If the catalyst contains non-noble Group VIII metals and/or Group VIB metals as hydrogenation metals, it is preferably sulfided prior to use. This may be done in an otherwise conventional manner, say, by contacting the catalyst in the reactor at increasing temperature with hydrogen and a sulfur-containing feed, or with a mixture of hydrogen and hydrogen sulfide. If the catalyst contains a noble Group VIII metal, there is no need for sulfiding as a rule, and a reducing step, e.g. with hydrogen, will suffice.

Process for converting heavy feedstock into middle distillates

The catalyst according to the invention is particularly suitable for use in a process for converting heavy feedstock into middle distillates, in particular diesel, which process comprises contacting the feedstock at elevated temperature and pressure with hydrogen in the presence of the catalyst of the present invention.

The following process parameters are generally applied in the process of the invention:

| temperature: | in the range of 250–500° C. |
|---|---|
| hydrogen pressure: | up to 300 bar |
| space velocity: | in the range of 0.1 to 5 kg feed per liter catalyst per hour (kg/l/h) |
| H$_2$/oil ratio: | in the range of 100 to 2500 Nl/l |

More preferably, the process of the present invention is carried out at the following process conditions:

| temperature: | in the range of 300° to 450° C. |
|---|---|
| hydrogen pressure: | in the range of 25 to 200 bar |
| space velocity: | in the range of 0.2 to 5 kg feed per liter catalyst per hour (kg/l/h) |
| H$_2$/oil ratio: | in the ranqe of 250 to 2000 Nl/l |

Generally, the conditions selected are such as will give a conversion of at least 70 wt %. The term conversion in this context refers to the weight, in percent, of obtained product with a boiling point below 360° C. vis-à-vis the weight of the feedstock deployed.

Suitable feedstocks for the process of the present invention are, e.g., gas oils, deasphalted oils, coker gas oils, and other thermally cracked gas oils and syncrudes, optionally originating from tar sands, shape oils, residue upgrading processes, or biomass. Combinations of various feedstocks can be applied.

Optionally, part or all of the feedstock can be subjected to a hydrotreatment prior to hydrocracking to remove sulfur- and/or nitrogen-containing compounds from the feedstock. Use can be made, e.g., of two reaction zones arranged in series, with at least part and preferably the entire effluent from the first reaction zone where the hydrotreating step is performed being passed to the second reaction zone where the hydrocracking occurs. The first reaction zone comprises, e.g., a conventional hydrotreating catalyst which, e.g., contains at least one Group VIB and/or at least one Group VIII metal component on an amorphous support, e.g., an alumina support. The second reaction zone preferably comprises the catalyst composition of the present invention.

The present invention is illustrated by the following Examples.

EXAMPLE 1

(Catalyst According to the Invention)

An ammonium-exchanged cogel comprising oxidic compounds of aluminum, silicon, and magnesium was prepared as described in the above-mentioned non-prepublished international patent application. This cogel had the following characteristics:

| $C_A$: | 56% |
|---|---|
| $G_B$: | 17%, |
| amount of the total of Na and K | 0.04 wt % |
| surface area | 563 m$^2$/g |
| molar silica alumina ratio | 10.8 |
| atomic ratio between magnesium and the sum of silicon and aluminum | 0.36 |

Alumina was peptized by mixing it with some HNO$_3$ and water. Then the alumina, a zeolite commercially available from Zeolyst under the designation CBV-720 (unit cell size: 24.30 Å, silica/alumina molar ratio (SAR): 30), and the ammonium-exchanged cogel were added in such amounts as to obtain a mixture comprising 10 wt % of the zeolite, 60 wt % of the cogel, and 30 wt % of the alumina. The mixture was kneaded until an extrudable dough was formed. The mixture was then extruded, and the resulting 1.5 mm cylindrical extrudates were dried overnight at 120° C. and subsequently calcined for 1 hour at a temperature of 550° C.

The extrudates were impregnated with an aqueous solution of Ni(NO$_3$)$_2$6H$_2$O and ammonium tungstate. The sample was subsequently dried at a temperature of 120° C and calcined at a temperature of 480° C. during one hour.

The analysis of the catalyst resulted in the following values

| SiO$_2$ | 37.5 wt % |
|---|---|
| MgO | 8.3 wt % |
| Al$_2$O$_3$ | 26.1 wt % |
| NiO | 6.8 wt % |
| WO$_3$ | 21.3 wt % |
| Na$_2$O | 0.05 wt % |
| B.E.T. surface area | 212 m$^2$/g |

EXAMPLE 2

(Catalyst According to the Invention)

A clay comprising saponite was prepared as described in Example 7 of WO 96/07613. The resulting filter cake was subsequently ammonium-exchanged by reslurrying it in 2.5 displacements of 10 wt % ammonium chloride (pH=5.4). The resulting mixture was stirred for 45 minutes at 50° C. The mixture was then dewatered and the whole procedure was repeated once again. The filter cake was then washed thoroughly with demineralised water until no chloride could be detected anymore using a silver nitrate solution. Finally the filter cake was dried overnight at 120° C.

The saponite had the following characteristics:

amount of the total of Na and K 0.04 wt % molar silica alumina ratio 11.8 atomic ratio between magnesium 0.44
and the sum of silicon and
aluminum

The alumina and the zeolite described in Example 1 and the ammonium-exchanged saponite were added in such amounts as to obtain a mixture comprising 10 wt % of the zeolite, 60 wt % of the saponite, and 30 wt % of the alumina. The mixture was then treated, impregnated, and calcined as described in Example 1.

The analysis of the catalyst resulted in the following values

| | |
|---|---|
| $SiO_2$ | 36.9 wt % |
| MgO | 9.4 wt % |
| $Al_2O_3$ | 25.3 wt % |
| NiO | 6.9 wt % |
| $WO_3$ | 21.5 wt % |
| $Na_2O$ | 0.04 wt % |
| B.E.T. surface area | 297 m$^2$/g |

COMPARATIVE EXAMPLE

In this Example, a conventional silica-alumina is used instead of the clays or cogel of the present invention. The silica-alumina had the following properties:

amount of the total of Na and K 0.07 wt % molar silica alumina ratio 4.2 atomic ratio between magnesium 0
and the sum of silicon and
aluminum

The alumina and the zeolite described in Example 1 and the conventional silica-alumina were added in such amounts as to obtain a mixture comprising 10 wt % of the zeolite, 60 wt % of the silica-alumina, and 30 wt % of the alumina. The mixture was then treated, impregnated, and calcined as described in Example 1. The analysis of the catalyst resulted in the following values

| | |
|---|---|
| $SiO_2$ | 37.2 wt % |
| MgO | 0.0 wt % |
| $Al_2O_3$ | 36.0 wt % |
| NiO | 6.4 wt % |
| $WO_3$ | 20.4 wt % |
| $Na_2O$ | 0.05 wt % |
| B.E.T. surface area | 296 m$^2$/g |

EXAMPLE 4

(Catalytic Testing)

Before being tested the catalysts were presulphided by heating for 4 hours in a 10 vol % $H_2S$/90 vol % $H_2$ gas stream at 385° C. and atmospheric pressure. The presulphided catalysts were then tested in hydrocracking involving a hydrotreated heavy vacuum gas oil. The hydrotreated heavy vacuum gas oil had an initial sulphur content of 189 ppm and an initial nitrogen content of 33 ppm. Before being applied in the tests, it was spiked with dimethyldisulphide and t-butylamine until a sulphur content of 2 wt % and a nitrogen content of 1000 ppm was reached. The further characteristics of the hydrotreated vacuum gas oil were as follows:

| | |
|---|---|
| initial boiling point | 106° C. |
| 5 wt % | 248° C. |
| 10 wt % | 297° C. |
| 20 wt % | 346° C. |
| 30 wt % | 378° C. |
| 40 wt % | 403° C. |
| 50 wt % | 424° C. |
| 60 wt % | 442° C. |
| 70 wt % | 464° C. |
| 80 wt % | 488° C. |
| 90 wt % | 517° C. |
| 95 wt % | 540° C. |
| final boiling point | 599° C. |

The tests were performed at three different temperatures in the range of 375° C.–400° C. applying the following test conditions:

hydrogen pressure: 120 bar space velocity (LHSV): 1.00 liter feed per liter catalyst per hour (1/h)

$H_2$/oil ratio: 1000 Nl/l

The required operating temperature (ROT) and the diesel selectivity (defined as the weight fraction with a cut point of 260° C.–360° C., based on the total weight of fresh feed) were determined for a conversion of 70%. The term conversion in this context refers to the weight, in percent, of obtained product with a boiling point below 360° C. vis-à-vis the weight of the feedstock deployed. The determination of the diesel selectivity and the ROT are well within the scope of the skilled person.

TABLE 1

| | ROT (° C.) | diesel selectivity (wt %) |
|---|---|---|
| Example 1 | 393.0 | 22.5 |
| Example 2 | 393.9 | 22.6 |
| Comparative Example | 394.0 | 21.9 |

From Table 1 it becomes clear that the diesel selectivities of Examples 1 and 2 are higher than that of the Comparative Example, whereas the ROT is in the same range (Example 2) or even lower (Example 1). Examples 1 and 2 according to the present invention are thus clearly advantageous over the Comparative Example.

What is claimed is:

1. A carrier composition comprising
    a) at least 40 wt % of a synthetic cracking component, based on the total weight of the carrier composition, which comprises oxidic compounds of one or more trivalent metallic elements, tetravalent metallic elements, and divalent metallic elements, said cracking component comprising elemental clay platelets with an average diameter of 1 μm or less and an average degree of stacking of 20 platelets per stack or less, and/or comprising a cogel with a saponite content $C_A$ of less than 60%, and in which the total of sodium and potassium (calculated as metal) amounts to less than 1 wt %, based on the total weight of the cogel, and
    b) 1–25 wt % of zeolite Y, based on the total weight of the carrier composition, with a unit cell size between 24.20 and 24.35 Å.

2. The carrier composition of claim 1 wherein the clay of which the clay platelets are formed is a saponite.

3. The carrier composition of claim 1 wherein the cogel comprises oxidic compounds of, aluminum, silicon, and magnesium.

4. The carrier composition of claim 1 wherein the carrier composition comprises an amorphous support material.

5. The carrier composition of claim 4 wherein the amorphous support material comprises alumina.

6. A catalyst comprising the carrier composition of claim 1 and at least one hydrogenation metal component selected from a Group VIB metal component, a Group VIII metal component or mixtures thereof.

7. The catalyst of claim 6 wherein the hydrogenation metal component comprises a combination of tungsten and nickel components.

8. A process for converting heavy feedstock into middle distillates comprising contacting the feedstock at elevated temperature and pressure with hydrogen in the presence of the catalyst of claim 6.

9. A process for converting heavy feedstock into middle distillates comprising contacting the feedstock at elevated temperature and pressure with hydrogen in the presence of the catalyst of claim 7.

* * * * *